No. 672,725. Patented Apr. 23, 1901.
C. O. WICKERSHAM.
COMBINED BOX AND FLOOR.
(Application filed Aug. 16, 1900.)
(No Model.)
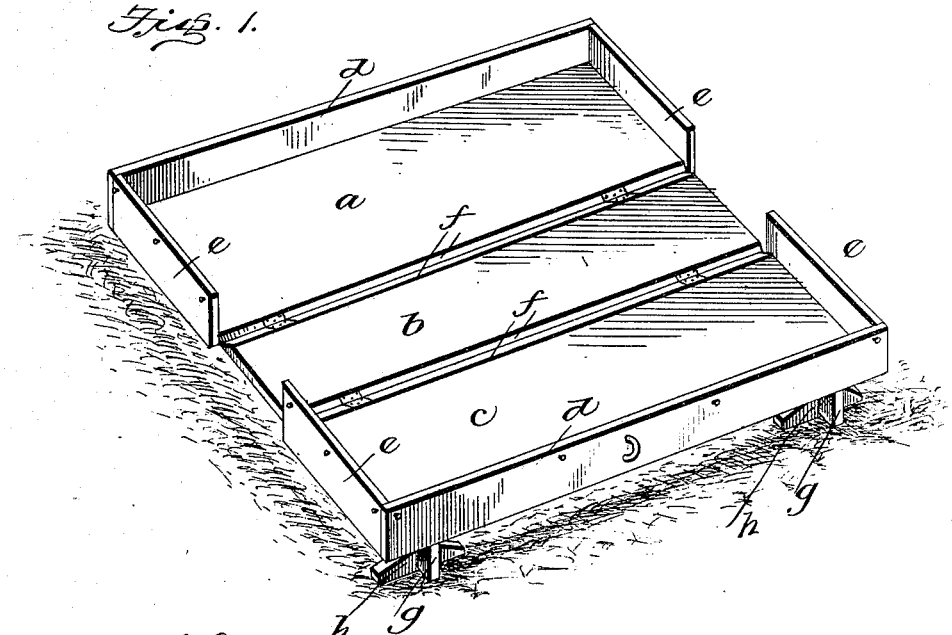
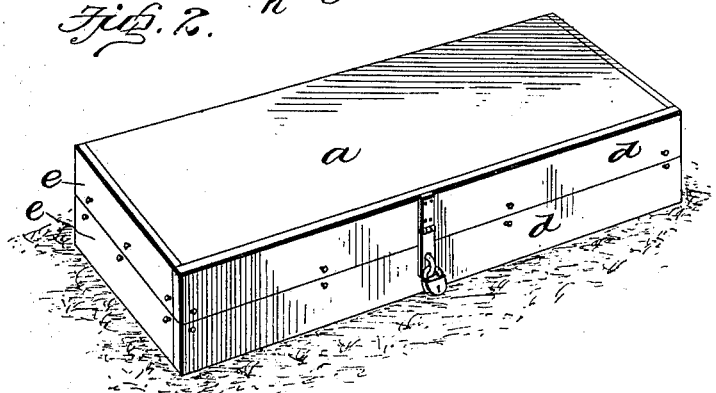
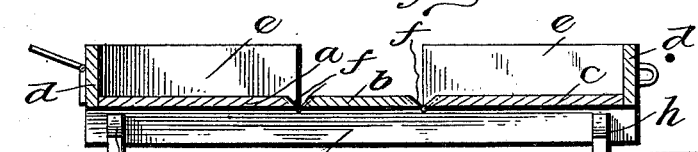

UNITED STATES PATENT OFFICE.

CECIL O. WICKERSHAM, OF ELGIN, ILLINOIS.

COMBINED BOX AND FLOOR.

SPECIFICATION forming part of Letters Patent No. 672,725, dated April 23, 1901.

Application filed August 16, 1900. Serial No. 27,056. (No model.)

*To all whom it may concern:*

Be it known that I, CECIL O. WICKERSHAM, a citizen of the United States, residing at Elgin, in the county of Kane and State of Illinois, have invented certain new and useful Improvements in a Combined Box and Floor; and I do declare the following to be a full, clear, and exact description of the invention, such as will enable others skilled in the art to which it appertains to make and use the same.

The invention relates to a combined box and floor, and is particularly designed for camping parties, although it may be used with good results for army purposes, and comprises in its construction a device which may be readily converted from a floor into a box, and vice versa. When converted from a tent-floor into a box, the camping outfit—such as the tent-covering, tent-poles, stakes, camp-chairs, cooking utensils, &c.—may be readily packed for storage or transportation to form a compact mass and will take up but little room.

Referring to the drawings, Figure 1 is a perspective view of the device when used as a tent-floor. Fig. 2 is a similar view of the device when used as a box, and Fig. 3 is a cross-sectional view of the device when in the position shown in Fig. 1.

In the drawings, $a$, $b$, and $c$ denote longitudinal strips in the form of bars. The strips $a$ and $c$ each has secured to its edges longitudinal side pieces $d$, connected at their ends by end pieces $e$. The central strip $b$ has neither side pieces nor end pieces. The pieces $a$, $b$, and $c$ are hinged together, as shown, and the edges of the strips are beveled, as shown at $f$. When straightened out flat to serve as a tent-floor, the strips $a$, $b$, and $c$ rest upon the edges of sills or supports $g$, which are supported near their ends by cross-pieces or feet $h$, and when fitted in the position shown in Fig. 2 the end pieces $e$ serve as the ends of the box, while the side pieces $d$ serve as the sides of the box. The strips $a$ $c$ serve as the top and bottom of the box. Any suitable lock may be employed for holding the parts in the position shown in Fig. 2. I have shown a hasp and padlock in the accompanying drawings for accomplishing this purpose. If desired, the end pieces $e$ and side pieces $d$ are provided with buttons for securing the walls of the tent in place at their lower ends.

When used as a tent-floor, the articles in the tent are supported above the ground, thus greatly lessening the danger of camping out in damp localities.

When used as a box, the tent-covering, poles, cooking utensils, and appurtenances may be conveniently packed within the box for storage or transportation.

From the foregoing description, taken in connection with the accompanying drawings, the construction, operation, and advantages of my invention will be readily understood without requiring an extended explanation.

The device is exceedingly useful for the purpose for which it is designed and may be placed upon the market at a comparatively small cost.

Having thus fully described my invention, what I claim as new, and desire to secure by Letters Patent, is—

A combined box and floor consisting of three main parts only, to wit: companion outer sections $a$ and $c$, and an intermediate section $b$, having beveled meeting edges $f$, hinges connecting said sections together at their said meeting edges, said outer sections being provided with corresponding rigid side pieces $d$ and end pieces $e$ having a combined width equal to the width of the central section, and buttons projecting outwardly from the said end and side pieces to serve as means for fastening the sides of the tent in position while said central section is without either side or end pieces, the construction being such that when said sections are folded the outer sections form the top and bottom of the box, the intermediate section the rear wall of the box, and said side and end pieces the front and end walls of the box, substantially as set forth.

In testimony whereof I have hereunto set my hand in presence of two subscribing witnesses.

CECIL O. WICKERSHAM.

Witnesses:
 CHARLES HAZLEHURST,
 W. E. BISHOP.